United States Patent [19]

Miller et al.

[11] Patent Number: 5,720,457
[45] Date of Patent: Feb. 24, 1998

[54] FURNITURE LEG WITH ANCHORING MEANS

[75] Inventors: Terry K. Miller, Blue Mountain; Edward L. Smith, Ripley; James R. Smith, New Albany, all of Miss.

[73] Assignee: S & M Furniture Mfg., Inc.

[21] Appl. No.: 763,406

[22] Filed: Dec. 11, 1996

Related U.S. Application Data

[63] Continuation of Ser. No. 427,246, Apr. 24, 1995, which is a continuation-in-part of Ser. No. 266,572, Jun. 28, 1994, abandoned.

[51] Int. Cl.⁶ .................................................. F16M 11/16
[52] U.S. Cl. .................... 248/188; 248/188.4; 297/440.1
[58] Field of Search ........................ 248/188, 188.1, 248/188.4, 188.8, 551; 297/445, 440.1

[56] References Cited

U.S. PATENT DOCUMENTS

| | | |
|---|---|---|
| 196,143 | 10/1877 | Alexander . |
| 835,582 | 11/1906 | Tobey . |
| 1,372,061 | 3/1921 | Buchberger . |
| 2,520,231 | 8/1950 | Anderson ................... 108/153 |
| 2,886,388 | 5/1959 | Perlmutter ................. 311/114 |
| 2,916,241 | 12/1959 | Bischof ...................... 248/188 |
| 3,516,633 | 6/1970 | Blackwood ................ 248/188 |
| 4,221,153 | 9/1980 | Medina ........................ 85/11 |
| 4,251,165 | 2/1981 | Forsen ....................... 248/188 |
| 4,338,039 | 7/1982 | Demonty ................. 403/403 X |
| 4,549,711 | 10/1985 | Giltnane .................... 248/188 |
| 5,143,343 | 9/1992 | Katz ......................... 248/551 |
| 5,203,528 | 4/1993 | Oke ........................ 248/188.4 |
| 5,419,649 | 5/1995 | Gilb ......................... 403/231 |

FOREIGN PATENT DOCUMENTS

| | | | |
|---|---|---|---|
| 241965 | 9/1962 | Australia ............. 297/440.1 |
| 245923 | 5/1963 | Australia ................. 248/188 |
| 1239576 | 7/1988 | Canada .................... 297/445 |
| 639805 | 9/1928 | France ..................... 248/188 |
| 940798 | 12/1948 | France ..................... 248/188 |
| 272079 | 2/1930 | Italy ...................... 248/188.8 |
| 618653 | 3/1961 | Italy ....................... 297/445 |
| 79718 | 11/1955 | Netherlands ............ 297/445 |
| 18992 | of 1909 | United Kingdom ........ 248/188.8 |
| 428710 | 5/1935 | United Kingdom ....... 248/188 |
| 625513 | 1/1947 | United Kingdom ....... 248/188 |
| 1203240 | 8/1970 | United Kingdom ....... 248/188 |

*Primary Examiner*—Leslie A. Braun
*Assistant Examiner*—Willie Berry, Jr.
*Attorney, Agent, or Firm*—Walker, McKenzie & Walker, P.C.

[57] ABSTRACT

A furniture leg attached to the underside of the frame of a piece of furniture. The furniture leg has a vertical bore through which a bolt is threadedly screwed into an internally-threaded insert on the frame, entrapping the furniture leg between the head of the bolt and the frame. In some embodiments, at least one, and preferably two, teeth extend upwardly from the upper surface of the furniture leg and pierce through the upholstery and into the frame, preventing the furniture leg from rotating about the axis of the bolt. In other embodiments, at least one, and preferably two, corrugated joiners extend upwardly from the upper surface of the furniture leg and pierce through the upholstery and into the frame, preventing the furniture leg from rotating about the axis of the bolt. One of the corrugated joiners may span a seam between bondedly and abuttingly joined pieces of the furniture leg, thereby also providing additional structural joining of the pieces of the furniture leg. In another embodiment, coacting hook-and-loop fasteners or joiners, spaced from the axis of the bolt on the upper surface of the furniture leg and the undersurface of the piece of furniture, prevent rotation of the furniture leg. All embodiments simultaneously secure the leg from rotation as the bolt draws the leg to the frame.

9 Claims, 2 Drawing Sheets

FURNITURE LEG WITH ANCHORING MEANS

CROSS-REFERENCES TO RELATED APPLICATIONS

This application is a continuation of U.S. application Ser. No. 08/427,246, filed Apr. 24, 1995, which is a continuation-in-part of now-abandoned application Ser. No. 08/266,572, filed Jun. 28, 1994, now abandoned, for a FURNITURE LEG WITH ANCHORING MEANS.

BACKGROUND OF THE INVENTION

1. Field of the Invention

The present invention relates, in general, to furniture construction, and, in particular, to a furniture leg including anchoring means for attaching the leg to an upholstered piece of furniture.

2. Information Disclosure Statement

Furniture builders require means to attach legs to the underside of an upholstered piece of furniture, such as a chair. Well-known solutions for this problem include nails, screws, bolts, and the like. However, prior art solutions typically require the drilling of starter holes for the various screws, etc., and prior art solutions frequently tear the upholstered fabric on the furniture during attachment of legs to the furniture.

Figure 1:
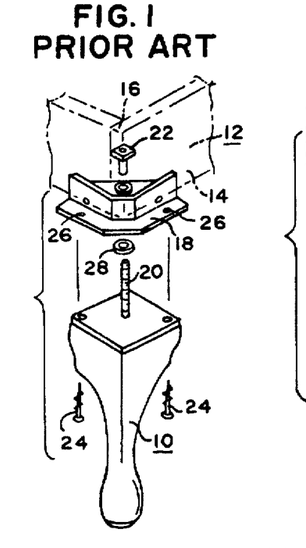
FIG. 1 is a perspective view of prior art anchoring means as used to attach a "Queen Anne" style front leg to a piece of furniture.

FIG. 1 shows a perspective view of prior art anchoring means as used to attach a "Queen Anne" style front leg 10 to a piece of furniture 12 (partially shown) having a frame 14. A front corner 16 of frame 14 typically has a bracket 18 affixed thereto, and a threaded stud 20, extending upwardly from leg 10, is threadedly received into an internally threaded nut 22. Leg 10 is turned about the axis of threaded stud 20 to cause threaded stud 20 to engage with nut 22 and draw leg 10 to frame 14. Once leg 10 has been drawn adjacent frame 14, screws 24 are screwingly inserted through holes 26 in leg 10 and into frame 14, thereby preventing leg 10 from turning about the axis of stud 20. A cup-shaped washer 28 is often placed on stud 20 between leg 10 and frame 14.

Figure 2:
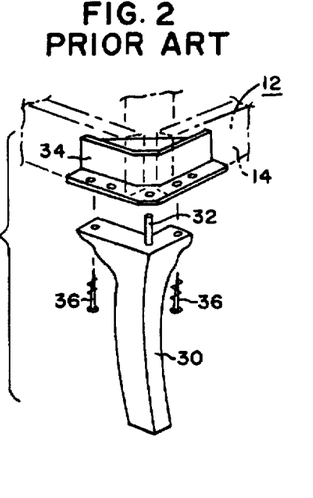
FIG. 2 is a perspective view of prior art anchoring means as used to attach a rear leg to a piece of furniture.

FIG. 2 shows a perspective view of prior art anchoring means as used to attach a rear leg 30 to the frame 14 of the piece of furniture 12. Such rear legs typically have an upwardly-extending non-threaded stud 32 that is received into bracket 34, with bracket 34 being previously secured to frame 14, and a plurality of screws 36 are used to anchor leg 30 to bracket 34 and frame 14.

Figure 3:
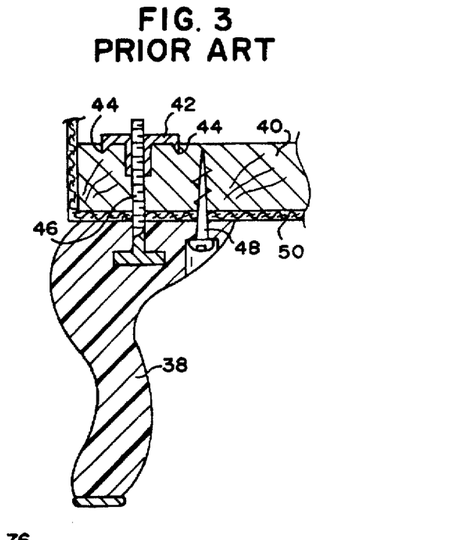
FIG. 3 is a side sectional view of a prior art anchoring means as used to attach a "Queen Anne" style front leg to a piece of furniture.

FIG. 3 shows a sectional view of another prior art "Queen Anne" style front leg 38, attached to a frame 40, where an internally-threaded insert 42 replaces nut 22, with insert 42 having downwardly-extending teeth 44. As with the leg 10 shown in FIG. 1, leg 38 is turned about the axis of its upwardly-extending threaded stud 46 so as to engage threaded stud 46 with threaded insert 42 and draw leg 38 against frame 40, and then leg 38 is secured to frame 40 as by screws 48.

These prior art furniture legs, however, require that starter holes be drilled into the frame of the furniture for the screws 24, 36, and 48, thereby causing extra labor steps in the attachment of the furniture leg to the furniture, and also requiring extra tools, namely, a drill and a screwdriver. The prior art furniture legs shown in FIGS. 1 and 3 also have a distinct disadvantage in that, as they are turned about the axis of their stud, sharp edges on the upper surface of the furniture leg tend to rip and tear the upholstery fabric 50 on the furniture, thereby causing the furniture to be ruined and necessitating the replacement of the upholstery.

It is therefore desirable to have a simpler and improved furniture leg in combination with anchoring means that permits the furniture leg to be attached to furniture without requiring the drilling of starter holes in the frame of the furniture and without tearing the upholstery of the furniture.

A preliminary patentability search in Class 312, subclass 351.3 and Class 248, subclass 188, produced the following patents, some of which may be relevant to the present invention: Alexander, U.S. Pat. No. 196,413, issued Oct. 23, 1877; Tobey, U.S. Pat. No. 835,582, issued Nov. 13, 1906; Buchberger, U.S. Pat. No. 1,372,061, issued Mar. 22, 1921; Perlmutter, U.S. Pat. No. 2,886,388, issued May 12, 1959; Blackwood, U.S. Pat. No. 3,516,633, issued Jun. 23, 1970; and Giltnane, U.S. Pat. No. 4,549,711, issued Oct. 29, 1985. None of these references disclose or suggest the present invention.

SUMMARY OF THE INVENTION

The present invention is a furniture leg with anchoring means for anchoring the furniture leg to the underside of a frame of a piece of furniture. The anchoring means includes fastener means for fastening the furniture leg to the underside of the frame through a vertical bore through the furniture leg, said fastener means including a body, such as a bolt, having a first end and a second threaded end, with the second threaded end of the fastener means being inserted through the furniture leg's bore and being threadedly engaged with respect to the frame of the furniture. One embodiment of the anchoring means further includes at least one tooth extending upwardly from the upper surface of the furniture leg and spaced from the bore, and the tooth has a distal end remote from the upper surface of the furniture leg for piercing the underside of the frame, thereby preventing rotation of the furniture leg about the axis of the bore. Another embodiment of the anchoring means includes a corrugated joiner partially inserted into the furniture leg and having a sharp edge remote from the upper surface of the furniture leg, for piercing the underside of the frame as the leg is drawn for securement to the frame, thereby preventing rotation of the furniture leg about the axis of the bore, and also for providing strengthening support to a glued joint of the furniture leg. Still another embodiment includes coacting fasteners or joiners, such as, for example, hook-and-loop fasteners similar to those sold under the trademark VELCRO, for preventing rotation of the furniture leg about the axis of the vertical bore.

It is an object of the present invention to provide anchoring means for attaching a furniture leg to a piece of furniture without requiring the drilling of starter holes in the frame of the furniture and without tearing the upholstery of the furniture. Such an improved furniture leg and attachment means should be simpler than the prior art heretofore known, and should reduce the labor required to install furniture legs on furniture. It is a further object of the present invention to secure the furniture leg from rotation with respect to the furniture frame simultaneously as the furniture leg is drawn toward the frame during assembly.

DESCRIPTION OF THE PREFERRED EMBODIMENTS

Referring to FIGS. 4–14, the preferred embodiments of the present invention are shown.

Figure 4:
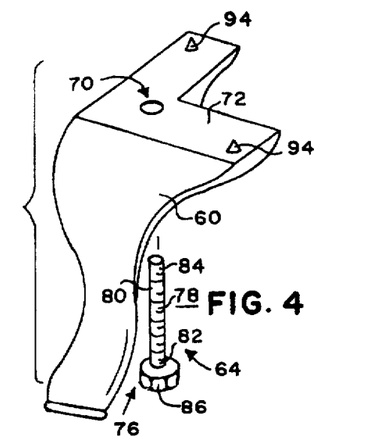
FIG. 4 is a perspective view of a "Queen Anne" style furniture leg of the present invention.
Figures 5, 6:
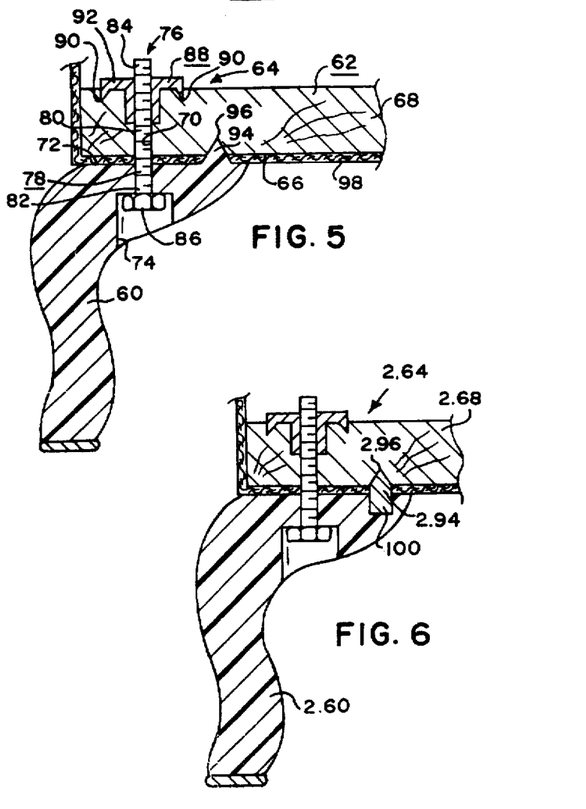
FIG. 5 is a side sectional view of the present invention shown attaching a "Queen Anne" style front leg to a piece of furniture.
FIG. 6 is side sectional view of a second embodiment of the present invention shown attaching a "Queen Anne" style front leg to a piece of furniture.

FIGS. 4 and 5 show the first preferred embodiment of the present invention. The present invention includes the combination of a furniture leg 60 for attachment to a piece of furniture 62 (partially shown), and anchoring means 64 for securely attaching furniture leg 60 to the underside 66 of frame 68 of piece of furniture 62 so that furniture leg 60 is secured from rotation about any axis with respect to frame 68. Furniture leg 60 is shown as a so-called "Queen Anne" style furniture leg as used for the front legs of chairs and couches, although other styles of legs may be used as well.

Furniture leg 60 has a bore 70 therethrough extending from upper surface 72 of furniture leg 60 and passing downwardly through furniture leg 60, preferably having an enlarged downwardly-opening countersunk recess 74 as shown.

Anchoring means 64 includes fastener means 76 for fastening furniture leg 60 to the underside 66 of frame 68 through bore 70, and fastener means 76 preferably is a bolt 78 (or equivalently a screw), with bolt 78 including a body 80 having a first end 82 and a threaded second end 84. Bolt 78 has a head 86 attached to its first end 82, and threaded second end 84 is adapted for insertion through bore 70 for threaded engagement with respect to frame 68 so that furniture leg 60 is entrappeal between frame 68 and head 86 of bolt 78 when threaded second end 84 is threadedly engaged with respect to frame 68.

Preferably, the present invention only has a single bolt 78 as shown, rather than a plurality of such bolts or screws as required by the prior art, and the head 86 of bolt 78 is countersunk into recess 74. Preferably, frame 68 has a well-known internally-threaded insert or so-called "T-nut" 88 pressed thereinto, with internally-threaded insert 88 having a plurality of downwardly-extending teeth 90 in piercing engagement with frame 68, thereby preventing rotation of internally-threaded insert 88 as bolt 78 is screwingly tightened thereinto through bore 70 of leg 60 and bore 70' in alignment therewith through frame 68. Internally-threaded insert 88 preferably has a circular top horizontal portion 92 from which teeth 90 extend downwardly at the circumference of circular top portion 92, in a manner well-known to those skilled in the art.

Anchoring means 64 further includes at least one tooth 94, and preferably two teeth 94, extending upwardly from the upper surface 72 of furniture leg 60 and spaced from bore 70, with teeth 94 each having a distal end 96, preferably sharp and pointed, for piercing the underside 66 of frame 68 as well as the layer of upholstery 98 thereon. As bolt 78 draws leg 60 toward the underside 66 of frame 68, teeth 94 are piercingly forced through the layer of upholstery 98 and into frame 68, thereby preventing leg 60 from rotating about the axis of bolt 78, and the upper surface 72 of furniture leg 60 is caused to tightly abut the layer of upholstery 98 upon the underside 66 of frame 68 and is caused to sandwich the layer of upholstery 98 between the underside 66 of frame 68 and the upper surface 72 of furniture leg 60.

Preferably, furniture leg 60 is one-piece molded plastic, and each tooth 94 is integral, i.e., one inseparable piece, with furniture leg 60. Teeth 94 may be conical, pyramidal, or any similar shape having a preferably sharp pointed distal end 96 remote from upper surface 72 of furniture leg 60, so as to easily pierce the underside of frame 68.

A second embodiment of the present invention is shown in FIG. 6, with identifying reference designators marked similarly to the first embodiment, except with the prefix "2.". It shall be understood that many aspects of the two embodiments are substantially the same, and only the differences will be treated in detail. The difference between first and second embodiments is in the structure of the upwardly-extending teeth of the anchoring means.

In the second embodiment, the upwardly-extending teeth 2.94 of anchoring means 2.64 may be metal, and have a lower portion 100 extending downwardly into and being entrapped by the furniture leg 2.60, which is preferably molded thereabout. As before, sharp distal end 2.96 pierces frame 2.68. In this second embodiment, teeth 2.94 may be conical or pyramidal as before, or they may instead be planar with a pointed distal end 2.96.

Figure 7:
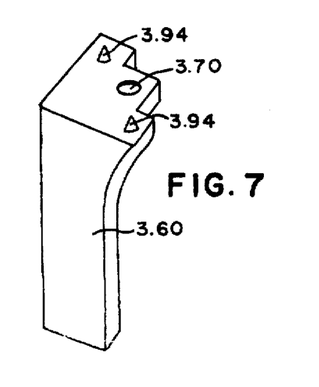
FIG. 7 is a perspective view of a rear furniture leg third embodiment of the present invention.

A third embodiment of the present invention is shown in FIG. 7, as might be used on a rear leg of a chair or couch, with identifying reference designators marked similarly to the first embodiment, except with the prefix "3.". It shall be understood that either of the varieties of upwardly-extending teeth shown in the first and second embodiments may be used for teeth 3.94 of the third embodiment, and the perspective drawing of FIG. 7 is merely to show the differences in style of the furniture leg 3.60. Like the first and second embodiments, the third embodiment also has fastening means, such as a bolt (not shown), for fastening the furniture leg 3.60 to the underside of the frame of the piece of furniture through bore 3.70, just as with the first and second embodiments.

A fourth embodiment of the present invention is shown in FIGS. 8 and 9, again shown in combination with a "Queen Anne" style furniture leg. Identifying reference designators are marked similarly to the first embodiment, except with the prefix "4.". Only the differences between the fourth embodiment and the first three embodiments will be discussed in detail, it being understood that similar structural features of all embodiments perform similar functions. As with the other embodiments, a bolt 4.78 secures leg 4.60 to frame 4.68 through bore 4.70.

Figures 13, 14:
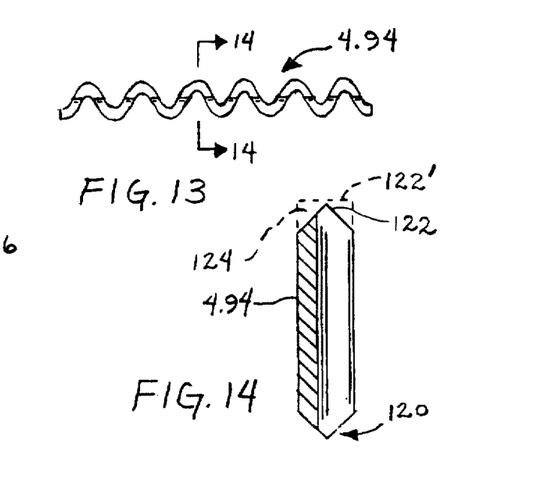
FIG. 13 is a top view of the corrugated joiner of the present invention.
FIG. 14 is a sectional view of the corrugated joiner of the present invention, taken substantially along the line 14—14 shown in FIG. 13.

In contrast to the tooth, i.e., 94, 2.94, or 3.94, of the first three embodiments, anchoring means 4.64 of the fourth embodiment includes at least one corrugated joiner 4.94, and preferably two such corrugated joiners 4.94 as shown, extending upwardly from upper surface 4.72 of furniture leg 4.60. As shown in FIGS. 13 and 14, corrugated joiner 4.94 includes a sharpened proximal end 120 and a sharpened distal end 122. Corrugated joiner 4.94 has a wavy or corrugated cross-section as shown in FIG. 13, and is somewhat similar to well-known prior art corrugated joiners used in the furniture industry. However, as shown in dotted outline in FIG. 14, well-known prior art corrugated joiners do not have a sharpened distal end 122, but instead have a flattened distal end 122', as shown in dotted outline, so that the well-known prior art corrugated joiners may be driven, as by a hammer, into wood for joining two pieces of wood together along a seam.

Figure 9:
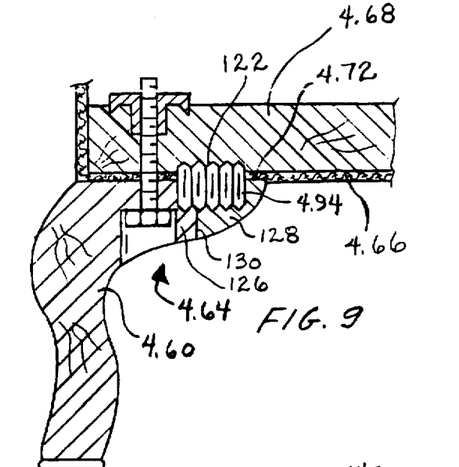
FIG. 9 is a side sectional view of the fourth embodiment of the present invention, shown attaching a "Queen Anne" style front leg to a piece of furniture.

As shown in FIG. 9, corrugated joiner 4.94 extends upwardly from upper surface 4.72 of furniture leg 4.60 for piercing engagement of sharpened distal end 122 with underside 4.66 of frame 4.68, and corrugated joiner 4.94 also penetrates downwardly through upper surface 4.72 into furniture leg 4.60, preferably with approximately three-quarters of corrugated joiner 4.94 being beneath surface 4.72 into furniture leg 4.60 and approximately one-quarter of corrugated joiner 4.94 being above surface 4.72 for piercing engagement with the frame 4.68. If desired, a well-known corrugated joiner either may be driven, as by a hammer, into furniture leg 4.60 and then the excess portion 124 may be removed as shown in FIG. 14, a by grinding or by use of a file, so as to create a sharpened distal end 122 of corrugated joiner 4.94, or else and preferably a powered "joiner driver" tool may be used to inject or "shoot" corrugated joiner 4.94 into furniture leg 4.60 in a similar manner as that used by well-known powered staple drivers, the advantage of using such a powered joiner driver tool being that corrugated joiner 4.94 can be pre-sharpened on both ends 120 and 122 before insertion, so as to not require grinding or filing of joiner 4.94 after insertion.

Figure 8:
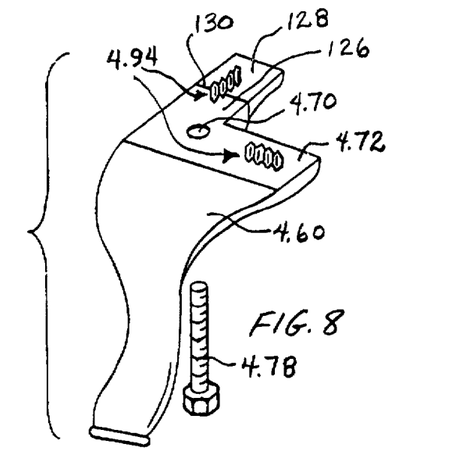
FIG. 8 is perspective view of a "Queen Anne" style furniture leg with a fourth embodiment of the present invention.

Furniture legs often are made of two or more pieces of bonded and abuttingly joined wood in a well-known manner, the two pieces being joined as by glue or other adhesive along a seam. Referring to FIGS. 8 and 9, furniture leg 4.60 shows such a construction, including a first piece 126 and a second piece 128 bondedly and abuttingly joined, as by glue or other adhesive, along a seam 130. One of corrugated joiners 4.94 preferably spans seam 130, penetrating downwardly into both first piece 126 and second piece 128. Such structure provides not only the anti-rotation function of all embodiments of the present invention because of the piercing engagement of corrugated joiner 4.94 with frame 4.68, but also and simultaneously provides added structural strength to the joint along seam 130 in a manner that will now be apparent.

Figure 10:
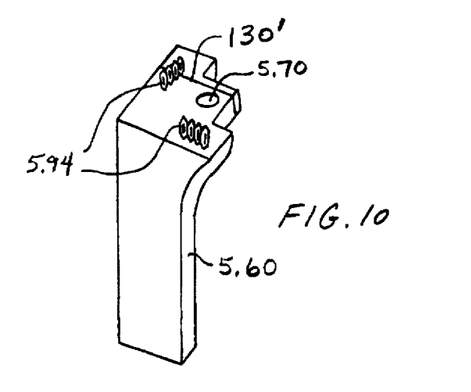
FIG. 10 is a perspective view of a rear furniture leg fifth embodiment of the present invention.

A fifth preferred embodiment of the present invention is shown in FIG. 10, as might be used on a rear leg of a chair or couch, with identifying reference designators marked similarly to the first embodiment, except with the prefix "5.". The only substantial difference between the fourth and fifth embodiments is that the fourth embodiment is shown in combination with a "Queen Anne" style furniture leg and the fifth embodiment is shown in combination with a rear leg of a chair or couch, and the perspective drawing of FIG. 10 is merely to show the differences in style of the furniture leg 5.60. The corrugated joiners 5.94 of the fifth embodiment are substantially identical to the corrugated joiners 4.94 of the fourth embodiment, and, just as in the fourth embodiment, one of the joiners may span a seam 130' in leg 5.60 so as to provide additional structural strength to the abuttingly joined pieces of leg 5.60. Like the first four preferred embodiments, the fifth embodiment also has fastening means, such as a bolt (not shown), for fastening the furniture leg 5.60 to the underside of the frame of the piece of furniture through bore 5.70, just as with embodiments one through four.

A description of the use of the first embodiment will be understood to suffice for the first five embodiments of the present invention. Bolt 78 is inserted through bore 70 and screwingly tightened into threaded insert 88 as by using a wrench, drawing leg 60 securely against the underside 66 of frame 68 and causing teeth 94 to pierce the layer of upholstery 98 on the underside 66 of frame 68 and to then pierce frame 68 as well, thereby securing leg 60 to frame 68. In the case of the fourth and fifth embodiments, the distal end 122 of the corrugated fastener similarly pierces the frame.

A sixth embodiment of the present invention is shown in FIGS. 11 and 12, again shown in combination with a "Queen Anne" style furniture leg. Identifying reference designators are marked similarly to the first embodiment, except with the prefix "6.". Only the differences between the sixth embodiment and the first five embodiments will be discussed in detail, it being understood that similar structural features of all embodiments perform similar functions. As with the other embodiments, a bolt 6.78 secures leg 6.60 to frame 6.68 through bore 6.70.

Figure 11:
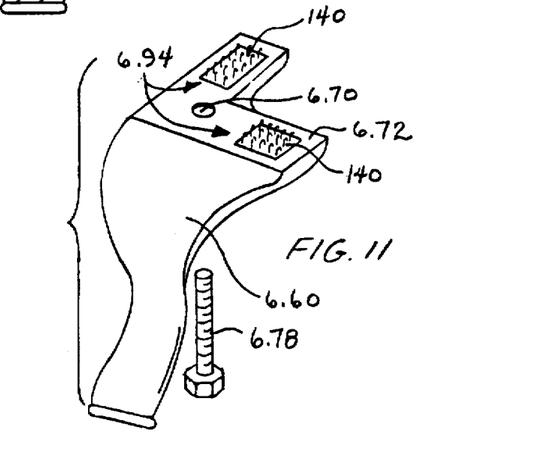
FIG. 11 is a perspective view of a "Queen Anne" style furniture leg with a sixth embodiment of the present invention.
Figure 12:
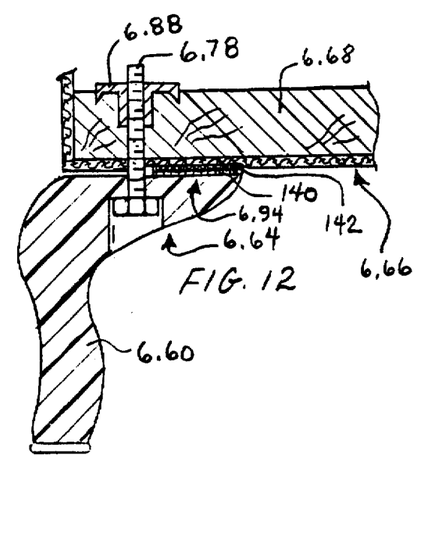
FIG. 12 is a side sectional view of the sixth embodiment of the present invention, shown attaching a "Queen Anne" style front leg to a piece of furniture.

In contrast to the tooth, i.e., 94, 2.94, or 3.94, of the first three embodiments and the corrugated joiners 4.94 and 5.94 of the fourth and fifth embodiments, anchoring means 6.64 of the sixth embodiment includes at least one joining means 6.94, and preferably two such joining means 6.94 as shown, for securing the upper surface 6.72 of furniture leg 6.60 to the underside 6.66 of frame 6.68. Joining means 6.94, preferably a hook-and-loop type fastener similar to that sold under the trademark VELCRO, includes a first locking portion 140 fixedly attached to upper surface 6.72 of furniture leg 6.60 and a coacting second locking portion 142 fixedly attached to the underside 6.66 of frame 6.68. Any well-known bonding means such as adhesive or the like may be used to attach locking portions 140 and 142 to surfaces 6.72 and 6.66, and coacting locking portions 140 and 142 are placed so as to be in alignment with each other when leg 6.60 is secured to frame 6.68 for interlocking engagement of locking portions 140 and 142.

Although locking portion 140 may be the hook-type portion and locking portion 142 may be the corresponding loop-type portion of joining means 6.94 as shown, the roles of the two portions could equivalently be reversed with locking portion 140 being the loop-type portion and locking portion 142 being the hook-type portion. It should be understood that there are also many well-known equivalents to coacting hook-and-loop fasteners or joiners, such as, for example, coacting post-and-post interlocking fasteners, etc., and these equivalents could also be used for joining means 6.94 without departing from the spirit and scope of the present invention.

It should also be understood that other variations of the sixth embodiment are also within the scope of the present invention, as, for example, by providing the hook-and-loop joining means on a rear furniture leg instead of on a "Queen Anne" style furniture leg.

To use the sixth embodiment of the present invention, bolt 6.78 is inserted through bore 6.70 and screwingly tightened into threaded insert 6.88 as by using a wrench, drawing leg 6.60 securely against the underside 6.66 of frame 6.68 and causing aligned coacting first and second portions 140 and 142 to interlockingly engage as leg 6.60 is drawn toward frame 6.68, thereby securing leg 6.60 from rotation with respect to frame 6.68. It should be understood that FIG. 12 shows leg 6.60 in the process of being drawn toward frame 6.68 with a small gap therebetween for clarity of illustration only, it being understood that leg 6.60 will fully abut with the undersurface 6.66 of frame 6.68 after installation.

A characteristic feature of all embodiments of the present invention is that they all include anchoring means (94, 2.94, 3.94, 4.94, 5.94, or 6.94) for preventing rotation of the furniture leg about the longitudinal axis of the bore (70, 2.70, 3.70, 4.70, 5.70, or 6.70) by securing the leg from rotation simultaneously as the threaded second end of the body or bolt (78, 2.78, 3.78, 4.78, or 6.78) is threadedly engaged with respect to the frame and as the furniture leg is drawn toward the frame. The leg is thus secured from rotation not only during assembly and tightening of the bolt, but also after assembly while the leg is affixed to the frame. This is in sharp contrast to prior art attachments, which required additional labor steps to insert additional screws (see FIGS. 1–3), and which do not simultaneously secure the leg from rotation as the leg is attached to and drawn toward the frame in the manner of the present invention.

Although the present invention has been described and illustrated with respect to preferred embodiments and a preferred use therefor, it is not to be so limited since modifications and changes can be made therein which are within the full intended scope of the invention.

We claim:

1. In combination,
   (a) a furniture leg for attachment to a piece of furniture, said piece of furniture having a frame and said frame having an underside, said furniture leg having an upper surface and said furniture leg having a bore therethrough extending from said upper surface of said furniture leg and passing downwardly completely through said furniture leg; and
   (b) anchoring means for securely attaching said furniture leg to said underside of said frame so that said furniture leg is secured from rotation about any axis with respect to said frame, said anchoring means comprising:
      i. fastener means for fastening said furniture leg to the underside of said frame through said bore, said fastener means including a body having a first end and a threaded second end, said fastener means further including a head attached to said first end of said body, said threaded second end of said body being adapted for insertion through said bore and for threaded engagement with respect to said frame so that said furniture leg is entrapped between said frame and the head of said fastener means when said threaded second end of said body is threadedly engaged with respect to said frame; and
      ii. at least one tooth extending upwardly from said upper surface of said furniture leg and radically spaced from said bore, said at least one tooth having a pointed distal end outwardly remote from said upper surface of said furniture leg for piercing said underside of said frame without engagement with any pre-formed hole into said frame, said tooth being fixedly secured to said furniture leg before, during, and after attachment of said leg to said piece of furniture, whereby said tooth is adapted to pierce the underside of the frame when the bolt draws the leg upper surface into contact with said frame to thereby prevent rotation of the leg while bolt continues to be tightened.

2. The combination as recited in claim 1, in which said at least one tooth is integral with said furniture leg and said distal end of said at least one tooth is sharp.

3. The combination as recited in claim 1, in which said furniture leg is molded plastic, and in which said at least one tooth is an integrally molded part of said furniture leg and said distal end of said at least one tooth is sharp.

4. The combination as recited in claim 1, in which said at least one tooth includes a lower portion extending into and beneath said upper surface of said furniture leg, said lower portion being entrapped by said furniture leg.

5. In combination,
   (a) a piece of furniture, said piece of furniture having a frame and said frame having an underside;
   (b) a furniture leg attached to the underside of said frame, said furniture leg having an upper surface and said furniture leg having a bore completely therethrough extending from said upper surface of said furniture leg and passing downwardly through said furniture leg; and
   (c) anchoring means for securely attaching said furniture leg to said underside of said frame with said upper surface of said furniture leg abutting the underside of said frame and with said furniture leg being secured from rotation about any axis with respect to said frame, said anchoring means comprising:
      i. a single threaded bolt having a head, said threaded bolt being screwingly inserted through said bore and threadedly engaged with respect to said frame so that said furniture leg is entrapped between said frame and the head of said bolt; and
      ii. at least one tooth extending upwardly from said upper surface of said furniture leg and radically spaced from said bore, said tooth having a pointed distal end outwardly remote from said upper surface of said furniture leg in piercing engagement with said underside of said frame without engagement with any pre-formed hole into said frame, said tooth being fixedly secured to said furniture leg before, during, and after attachment of said leg to said piece of furniture, whereby said tooth is adapted to pierce the underside of the frame when the bolt draws the leg upper surface into contact with said frame to thereby prevent rotation of the leg while the bolt continues to be tightened.

6. The combination as recited in claim 5, in which said at least one tooth is integral with said furniture leg and said distal end of said at least one tooth is sharp.

7. The combination as recited in claim 5, in which said furniture leg is molded plastic, and in which said at least one tooth is an integrally molded part of said furniture leg and said distal end of said at least one tooth is sharp.

8. The combination as recited in claim 5, in which said at least one tooth includes a lower portion extending into and beneath said upper surface of said furniture leg, said lower portion being entrapped by said furniture leg.

9. In combination,
   (a) a furniture leg for attachment to a piece of furniture, said piece of furniture having a frame and said frame having an underside, said furniture leg having an upper surface and said furniture leg having a bore completely therethrough extending from said upper surface of said furniture leg and passing downwardly through said furniture leg, said bore having a longitudinal axis; and (b) anchoring means for securely attaching said furniture leg to said underside of said frame so that said furniture leg is secured from rotation about any axis with respect to said frame, said anchoring means comprising:

i. fastener means for fastening said furniture leg to the underside of said frame through said bore, said fastener means including a body having a first end and a threaded second end, said fastener means further including a head attached to said first end of said body, said threaded second end of said body being adapted for insertion through said bore and for threaded engagement with respect to said frame so that said furniture leg is entrapped between said frame and the head of said fastener means and so that said furniture leg is drawn toward said frame when said threaded second end of said body is threadedly engaged with respect to said frame; and at least one anti-rotation means extending upwardly from the upper surface of said furniture leg and radially spaced from said bore, said anti-rotation means being fixedly secured to said furniture leg before, during, and after attachment of said leg to said piece of furniture whereby said anti-rotation means is adapted to pierce the underside of the frame when the fastener means draws the leg upper surface into contact with said frame to thereby prevent rotation of the leg while the fastener means continues to be tightened.

* * * * *

UNITED STATES PATENT AND TRADEMARK OFFICE
CERTIFICATE OF CORRECTION

PATENT NO.   : 5,720,457
DATED        : February 24, 1998
INVENTOR(S)  : Terry K. Miller, et al It is certified that error appears in the above-identified patent and that said Letters Patent is hereby corrected as shown below:

The title page should be deleted and substitute therefor the attached title page. Delete Drawing Sheets 1-2, and substitute therefor the Drawing Sheets, consisting of FIGS. 1-14, as shown on the attached pages.

Signed and Sealed this

Fifth Day of May, 1998

Attest:

BRUCE LEHMAN

Attesting Officer

Commissioner of Patents and Trademarks

United States Patent [19]
Miller et al.

[11] Patent Number: 5,720,457
[45] Date of Patent: Feb. 24, 1998

[54] FURNITURE LEG WITH ANCHORING MEANS

[75] Inventors: Terry K. Miller, Blue Mountain; Edward L. Smith, Ripley; James R. Smith, New Albany, all of Miss.

[73] Assignee: S & M Furniture Mfg., Inc.

[21] Appl. No.: 763,406

[22] Filed: Dec. 11, 1996

Related U.S. Application Data

[63] Continuation of Ser. No. 427,246, Apr. 24, 1995, which is a continuation-in-part of Ser. No. 266,572, Jun. 28, 1994, abandoned.

[51] Int. Cl.$^6$ .................................................. F16M 11/16
[52] U.S. Cl. ........................ 248/188; 248/188.4; 297/440.1
[58] Field of Search ......................... 248/188, 188.1, 248/188.4, 188.8, 551; 297/445, 440.1

[56] References Cited

U.S. PATENT DOCUMENTS

| | | |
|---|---|---|
| 196,143 | 10/1877 | Alexander. |
| 835,582 | 11/1906 | Tobey. |
| 1,372,061 | 3/1921 | Buchberger. |
| 2,520,231 | 8/1950 | Anderson ............................ 108/153 |
| 2,886,388 | 5/1959 | Perlmutter .......................... 311/114 |
| 2,916,241 | 12/1959 | Bischof ............................... 248/188 |
| 3,516,633 | 6/1970 | Blackwood ........................ 248/188 |
| 4,221,153 | 9/1980 | Medina ................................. 85/11 |
| 4,251,165 | 2/1981 | Forsen ................................ 248/188 |
| 4,338,039 | 7/1982 | Demonty ........................ 403/403 X |
| 4,549,711 | 10/1985 | Giltnane ........................... 248/188 |
| 5,143,343 | 9/1992 | Katz .................................... 248/551 |
| 5,203,528 | 4/1993 | Oke ................................. 248/188.4 |
| 5,419,649 | 5/1995 | Gilb ................................... 403/231 |

FOREIGN PATENT DOCUMENTS

| | | | |
|---|---|---|---|
| 241965 | 9/1962 | Australia ......................... 297/440.1 |
| 245923 | 5/1963 | Australia ......................... 248/188 |
| 1239576 | 7/1988 | Canada ............................ 297/445 |
| 639805 | 9/1928 | France ............................. 248/188 |
| 940798 | 12/1948 | France ............................. 248/188 |
| 272079 | 2/1930 | Italy ............................. 248/188.8 |
| 618653 | 3/1961 | Italy ................................. 297/445 |
| 79718 | 11/1955 | Netherlands ...................... 297/445 |
| 18992 | of 1909 | United Kingdom ............. 248/188.8 |
| 428710 | 5/1935 | United Kingdom ............... 248/188 |
| 625513 | 1/1947 | United Kingdom ............... 248/188 |
| 1203240 | 8/1970 | United Kingdom ............... 248/188 |

Primary Examiner—Leslie A. Braun
Assistant Examiner—Willie Berry, Jr.
Attorney, Agent, or Firm—Walker, McKenzie & Walker, P.C.

[57] ABSTRACT

A furniture leg attached to the underside of the frame of a piece of furniture. The furniture leg has a vertical bore through which a bolt is threadedly screwed into an internally-threaded insert on the frame, entrapping the furniture leg between the head of the bolt and the frame. In some embodiments, at least one, and preferably two, teeth extend upwardly from the upper surface of the furniture leg and pierce through the upholstery and into the frame, preventing the furniture leg from rotating about the axis of the bolt. In other embodiments, at least one, and preferably two, corrugated joiners extend upwardly from the upper surface of the furniture leg and pierce through the upholstery and into the frame, preventing the furniture leg from rotating about the axis of the bolt. One of the corrugated joiners may span a seam between bondedly and abuttingly joined pieces of the furniture leg, thereby also providing additional structural joining of the pieces of the furniture leg. In another embodiment, coacting hook-and-loop fasteners or joiners, spaced from the axis of the bolt on the upper surface of the furniture leg and the undersurface of the piece of furniture, prevent rotation of the furniture leg. All embodiments simultaneously secure the leg from rotation as the bolt draws the leg to the frame.

9 Claims, 2 Drawing Sheets